United States Patent [19]
Takita et al.

[11] Patent Number: 5,335,306
[45] Date of Patent: Aug. 2, 1994

[54] ULTRAVIOLET RESISTANT SILICA GLASS FIBER

[75] Inventors: Masatoshi Takita, Jyoetsu; Hiroyuki Hayami; Koichi Suzuki, both of Itami, all of Japan

[73] Assignees: Shin-Etsu Chemical Co., Ltd., Tokyo; Mitsubishi Cable Industries, Ltd., Amagasaki, both of Japan

[21] Appl. No.: 953,787

[22] Filed: Sep. 30, 1992

[51] Int. Cl.5 ................................. G02B 6/00
[52] U.S. Cl. ...................... 385/142; 501/37; 501/54; 385/115
[58] Field of Search .......... 501/37, 95, 53, 54; 252/582, 584, 588; 385/115, 116, 123, 126, 141, 142, 144

[56] References Cited

U.S. PATENT DOCUMENTS

| | | | |
|---|---|---|---|
| 4,504,114 | 3/1985 | Arrington | 385/144 X |
| 4,690,504 | 9/1987 | Yokokawa et al. | 350/96.34 |
| 4,799,754 | 1/1989 | Goldenberg | 350/96.18 |
| 4,988,162 | 1/1991 | Hayami | 350/96.25 |

FOREIGN PATENT DOCUMENTS 0488320  6/1992  European Pat. Off. .

OTHER PUBLICATIONS

D. K. Paul et al., "Proceedings: Fiber optics reliability: benign and adverse environments II", Sep. 8, 1988, Boston, Mass., vol. 992, pp. 36–42.

Chemical Abstracts, vol. 115, No. 4, Jul. 29, 1991, Columbus, Ohio, U.S.

Chemical Abstracts, vol. 113, No. 18, Oct. 29, 1990, Columbus, Ohio, U.S.

*Primary Examiner*—Rodney B. Bovernick
*Assistant Examiner*—John Ngo
*Attorney, Agent, or Firm*—Varndell Legal Group

[57] ABSTRACT

A silica glass optical fiber superior in resistance to ultraviolet rays, which fiber comprises a doped silica glass cladding layer formed on a silica glass core, said silica glass core having an OH content of 10–1000 ppm, a fluorine content of 50–5000 ppm, and being substantially free of chlorine.

13 Claims, 1 Drawing Sheet

ULTRAVIOLET RESISTANT SILICA GLASS FIBER

FIELD OF THE INVENTION

The present invention relates to a silica glass fiber, such as a single optical fiber and a bundle fiber consisting of a number of optical fibers, which is superior in resistance to degradation by ultraviolet rays passing therethrough and specifically to a bundle fiber suitable for spectral analysis.

Also, the present invention relates to a method of transmitting energy or signals by ultraviolet rays, which comprises transmitting ultraviolet rays through said silica glass fiber which is resistant to degradation by the ultraviolet rays.

BACKGROUND OF THE INVENTION

An optical fiber, particularly the one composed of a silica has been used at the ultraviolet region, not to mention at the visible light region. As the core material, used are silica glasses containing OH group but substantially free of fluorine, which may or may not contain chlorine. Said core material is mainly characterized by OH group intentionally contained therein, and is advantageous in that its output is great and initial characteristic is superior. On the other hand, its ultraviolet deterioration resistance characteristic, namely, resistance to the deterioration of core material caused by ultraviolet rays, is not, in general, entirely superior, and specifically said characteristic is insufficient at the wavelength of 215 nm.

In the meantime, silica glass core materials for optical fibers which have been used at the visible light region have received increasing demand from the field involving exposure to radiation, such as for nuclear power, and resistance to radiation has recently been strongly demanded of the optical fiber for use in such fields.

In view of the background as described, the present inventors developed a new optical fiber to be used at the visible light region, specifically an optical fiber composed of a silica glass core made of a core material intentionally containing fluorine, but substantially free of chlorine and OH group. This core material exhibits extremely superior resistance to radiation at the visible light region, whereas when used at the ultraviolet region, shows small initial characteristic and small output: substantially it is not practical for use at 250 nm or below.

SUMMARY OF THE INVENTION

An object of the present invention is to provide a silica glass fiber having excellent resistance to degradation by ultraviolet rays, which is for use at the ultraviolet region.

Another object of the present invention is to provide a method of transmitting energy or signals using a silica glass fiber having resistance to the deterioration caused by ultraviolet rays.

Further objects of the present invention will become clear from the description to follow hereunder.

The present inventors have continuously studied in an effort to solve the conventional problems which this kind of optical fiber composed of silica core materials have at the ultraviolet region, and to find out the composition of the silica glass which can reduce degree of deterioration by ultraviolet rays when used at the ultraviolet region and permits efficient transmission of energy or signals. The studies have led the present inventors to a new idea that fluorine, chlorine and OH group contents in the core material greatly influence ultraviolet resistance characteristic, and that an excellent ultraviolet resistance may be obtained by appropriately adjusting their contents. The present invention rests in the achievement of the aforementioned objects, motivated by this new idea.

The present inventors have found that efficient transmission of energy or signals using ultraviolet rays can be achieved by a single optical fiber composed of a doped silica glass cladding layer formed on a silica glass core or a bundle fiber consisting of a number of said fibers, said silica glass core having (1) an OH group content of 10–1000 ppm and (2) a fluorine content of 50–5000 ppm, and (3) being substantially free of chlorine, with greatly reduced deterioration of the silica glass fiber by ultraviolet rays.

That said silica glass fiber has excellent resistance to ultraviolet rays is unknown to those skilled in the art from the prior art, and one of ordinary skill in the art would not envision use of said silica glass fiber for the transmission of energy or signals by ultraviolet rays.

The present invention relates to a silica glass optical fiber or a bundle fiber for use in the ultraviolet region, wherein the optical fiber is composed of a doped silica glass cladding layer formed on a silica glass core, said silica glass core having (1) an OH group content of 10–1000 ppm and (2) a fluorine content of 50–5000 ppm, and (3) being substantially free of chlorine.

Also, the present invention relates to a method of transmitting energy or signals using ultraviolet rays, which comprises transmission of energy or signals using ultraviolet rays through a silica glass fiber resistant to degradation by the ultraviolet rays composed of a doped silica glass cladding layer formed on a silica glass core, said silica glass core having (1) an OH group content of 10–1000 ppm and (2) a fluorine content of 50–5000 ppm, and (3) being substantially free of chlorine, or a bundle fiber consisting of a number of said fibers.

DETAILED DESCRIPTION OF THE INVENTION

It is highly characteristic of the core material for a silica glass fiber of the present invention that it contains OH group and fluorine, but does not substantially contain chlorine as described above. As mentioned earlier, while the conventional core materials for ultraviolet rays contain OH group, they do not substantially contain fluorine, thus resulting in superior initial characteristic but poor ultraviolet deterioration resistance characteristic. On the other hand, the core material for visible light could be improved in radiation resistance by adding fluorine. The core material for a silica glass fiber of the present invention, in contrast, contains OH group as do the conventional core materials for ultraviolet silica glass fibers, and additionally contains fluorine such that the resistance to deterioration caused by ultraviolet rays can be improved. When the fluorine and OH group are contained in a specific proportion of 50–5000 ppm, and 10–1000 ppm, respectively, superior ultraviolet resistance characteristic, particularly remarkable improvements in initial transmission loss at the ultraviolet region and ultraviolet deterioration resistance characteristic can be revealed.

The optical fiber of the present invention can be roughly divided into a single fiber and a bundle fiber consisting of a number of said fibers.

Figure 1:
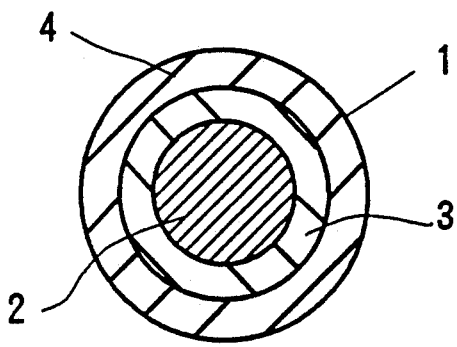
FIG. 1 is a cross sectional view of a single optical fiber of the present invention as described in Examples.

FIG. 1 is a cross sectional view of a single fiber, wherein 1 is a single optical fiber, 2 is a core layer, 3 is a cladding layer, and 4 is a supporting layer. The supporting layer is a protecting layer which is formed only when necessary and is not always formed.

The single fiber 1 in FIG. 1 can be produced, for example, in such a manner that a doped silica glass which becomes the cladding layer 3 is externally applied on a silica glass rod which becomes the core 2, or a cladding layer is internally applied, and the supporting layer 4 of a three-layer structure preforms obtained by the Rod-In-Tube method is removed by fire polishing to give a preform of a two-layer structure of the core 2 and the cladding layer 3.

Figure 2:
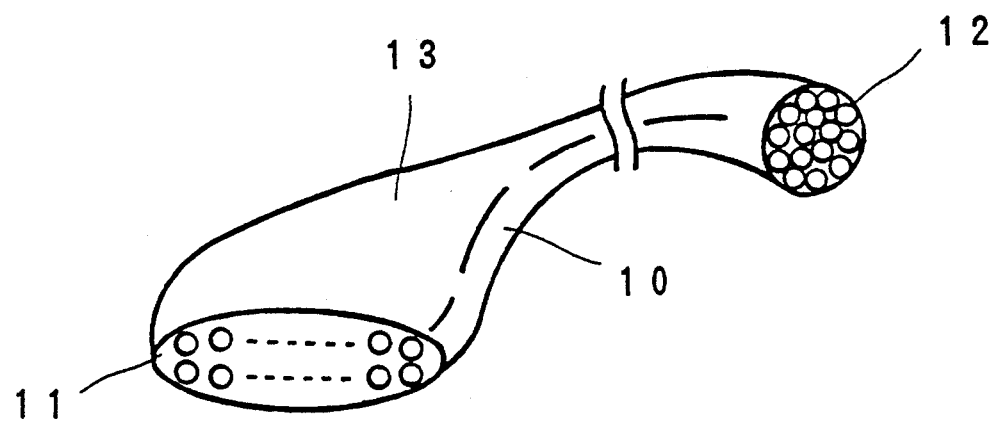
FIG. 2 is also a cross sectional view of a bundle fiber.

A bundle fiber 10 which is another embodiment of the present invention is produced by bundling a number of fibers, as shown in FIG. 2. The bundle fiber 10 at an output end 11 has normally one or two rows of fibers adhered by an appropriate means such as adhesives, and at a light input end 12, has fibers adhered to each other nearly in a round shape by adhesives, etc., as shown in FIG. 2. The fibers 1 in an intermediate part 13 between the output end 11 and the input end 12 are not adhered to each other but are apart. The bundle fiber 10 having this structure, it is flexible as a whole, and is vastly advantageous for use.

While the number of the fibers 1 in the bundle fiber is appropriately determined according to the object of use and places to be located, a representative bundle fiber contains 12–24 fibers of 1–3 m in length.

The core of the optical fiber of the present invention is composed of a pure silica glass having an OH group content of 10–1000 ppm, preferably 20–600 ppm, more preferably 30–400 ppm, and a fluorine content of 50–5000 ppm, preferably 200–3000 ppm, more preferably 300–2000 ppm, and being substantially free of chlorine, meaning that chlorine may be contained only in a slight proportion of, for example, 1 ppm at most. Such pure silica glass for core can be produced by a production method for synthetic silica glass, comprising, for example, burning at least one member of silicon compounds of the formula $R^1{}_mSi(OR^2)_{4-m}$ [hereinafter referred to as Compound (I)] and at least one member of fluorine compounds of the formula $C_aH_bF_c$ [hereinafter referred to as Compound (II)] with oxyhydrogen flame, and accumulating the resulting synthetic silica fine particles on a rotating heat-resistant base substance to give a porous sintered silica which is then heat-fused for vitrification. In the above-mentioned formulas, $R^1$ and $R^2$ are each a lower alkyl group having 1 to 4 carbon atoms such as methyl, ethyl, n-propyl, n-butyl, isobutyl, and so on, and $0 \leq m \leq 4$ (preferably $2 \leq m \leq 4$), $1 \leq a \leq 3$ (preferably $1 \leq a \leq 2$), $0 \leq b \leq 7$ (preferably $0 \leq b \leq 3$), and $1 \leq c \leq 8$ (preferably $2 \leq c \leq 4$).

The ratio of Compound (I) to Compound (II) is normally 100:0.5–10, preferably 100:1–8, more preferably 100:3–5.

As the heat-resistant base substance, those conventionally known may be used.

The cladding layer 3, as a dorpant, is made of, for example, a silica glass containing B and/or F. Such doped silica glass can be produced by the well-known Chemical Vapor Deposition method (CVD method) from a gas mixture of $BF_3$, $SiCl_4$, and oxygen, $BCl_3$, $BF_3$, $SiCl_4$, and oxygen, $BCl_3$, $SiF_4$, and oxygen, or $BF_3$ or $BCl_3$, $SiF_4$, and oxygen as a starting material.

Of the aforementioned material gas mixtures, particularly preferable is a gas mixture of $BF_3$, $SiCl_4$, and oxygen.

When the material constituting the support layer 4 to be formed as necessary is a silica glass containing a high degree of impurities, it may exert undesirable effect on the ultraviolet resistance to the extent that it can be expressed numerically. Therefore, the material constituting the support layer 4 is preferably a synthetic silica glass having a drawing temperature of at least 1800° C. which is exemplified by natural silica glasses and synthetic silica glasses, with preference given to high purity synthetic silica glass having a purity of not less than 99% by weight, particularly not less than 99.9% by weight.

The single optical fiber or the bundle fiber consisting of a number of said fibers are superior in the characteristic at the ultraviolet region as described earlier, and are extremely useful as an optical fiber for use under ultraviolet irradiation, or as a bundle fiber for medical use.

The present invention is hereinbelow described in detail by illustrating examples.

EXAMPLE 1

Methyltrimethoxysilane ($CH_3Si(OCH_3)_3$) as a silicon compound and tetrafluorocarbon ($CF_4$) as a fluorine compound were burnt for reaction while supplying 700N l/h hydrogen gas, 800N l/h oxygen gas, 500 g/h $CH_3Si(OCH_3)_3$, and 0.44 g/h $CF_4$. The synthesized silica fine particles were accumulated on a synthetic silica base substance to give a porous silica sintered product having an outer diameter of 60 mm and length of 230 mm. This sintered product was heated in a helium gas at 1550° C. under atmospheric pressure into molten glass to give a silica glass rod having an outer diameter of about 35 mm, and length of 200 mm. This glass rod had a chlorine content of 0.1 ppm or below, an OH content of 100 ppm, a fluorine content of 1100 ppm, other impurity content of 5 ppm, and a refractive index at 20° C. of 1.4575.

The chlorine content of silica glass was measured by activation analysis, the fluorine content was measured by ion analysis, and the OH content was estimated from the absorption loss at a wavelength of 2.73 μm by Fourier transform infrared spectrometer.

Explaining the determination of the OH content, it can be calculated by the following formula (1) wherein transmissivity (%) when the OH content at a wavelength of 2.73 μm is 0, is $T_0$, actual transmissivity of the measurement subject is $T_1$, and the thickness (mm) of the measurement subject is L.

$$OH(ppm) = \frac{1000}{L} \log_{10}\left(\frac{T_0}{T_1}\right)$$

Inserting a core rod (outer diameter: 15 mm) obtained by drawing the above-mentioned pure silica glass rod into a glass tube having on its inner surface a B-F-doped silica glass layer ($n^{20}$:1.4465) which was prepared from SiCl$_4$, BF$_3$, O$_2$, and a synthetic silica glass tube (outer diameter: 26 mm, thickness: 1.5 mm, n$^{20}$:1.459), there was obtained a three-layer structure preform (outer diameter: 16.5 mm) by the Rod-In-Tube method, which was then drawn while heating at 2000° C. to give an optical fiber having an outer diameter of 200 μm.

Thirteen aforementioned optical fibers (1.5 m in length) were bundled to give a bundle fiber.

EXAMPLES 2-6

Comparative Examples 1-5

Various kinds of core materials were prepared in the same manner as in Example 1 except that the OH content and F content in the core material were adjusted by changing the CF$_4$ content in the material gas, and that tetrachlorosilane (SiCl$_4$) was used in place of methyltrimethoxysilane (material gas) in Comparative Examples 4, 5, 9, and 10 in order to adjust the chlorine content, and bundle fibers were produced from respective fibers in the same manner as above. Then, initial characteristic and resistance to ultraviolet-induced deterioration of each bundle fiber obtained were determined, the results of which are summarized in Table 1 and Table 2.

Test Method

Figure 3:
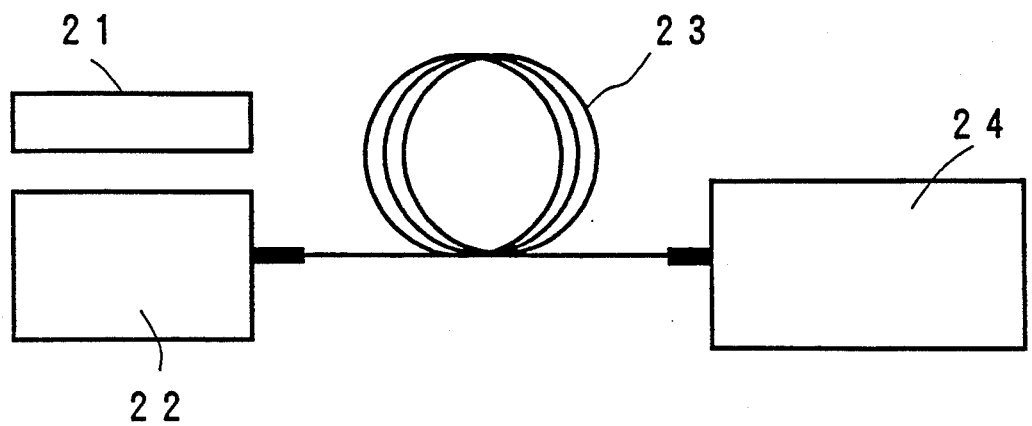
FIG. 3 depicts the method for testing the resistance to deterioration by ultraviolet rays possessed by the optical fiber in the atmosphere.

The measurement was conducted by the method shown in FIG. 3. In FIG. 3, 21 is a lamp light source, 22 is a D$_2$ lamp, 23 is an optical fiber to be tested, and 24 is an instantaneous measurement multi-system, in which used were the following.

Lamp light source : POWER SUPPLY C-1316
D$_2$ lamp : DEUTERIUMLAMP MC 962A
Multi-system : MCPD-1100, PC-9801 (personal computer)

TABLE 1-1

|  |  |  | Example | |  |
|---|---|---|---|---|---|
|  |  |  | 1 | 2 | 3 |
| Composition of | Cl |  | <0.1 | <0.1 | <0.1 |
| core material | OH |  | 100 | 100 | 60 |
| (ppm) | F |  | 1100 | 1400 | 1000 |
| Initial | 400 nm |  | 100 | 100 | 100 |
| characteristic | 250 nm |  | 233 | 218 | 160 |
| (ratio to the output | 230 nm |  | 310 | 278 | 232 |
| at 400 nm) (%) | 215 nm |  | 405 | 309 | 259 |
| Resistance to | 3h | 250 nm | 95 | 88 | 92 |
| deterioration by | 1h | 230 nm | 97 | 95 | 95 |
| ultraviolet rays | 3h | 230 nm | 96 | 94 | 93 |
| (ratio to the | 6h | 230 nm | 94 | 92 | 91 |
| initial character- | 12h | 230 nm | 93 | 90 | 90 |
| istic at the | 1h | 215 nm | 98 | 96 | 99 |
| same wavelength) | 3h | 215 nm | 97 | 94 | 97 |
| (%) | 6h | 215 nm | 94 | 89 | 90 |
|  | 12h | 215 nm | 89 | 80 | 83 |

TABLE 1-2

|  |  |  | Example | |  |
|---|---|---|---|---|---|
|  |  |  | 4 | 5 | 6 |
| Composition of | Cl |  | <0.1 | <0.1 | <0.1 |
| core material | OH |  | 30 | 200 | 450 |
| (ppm) | F |  | 3300 | 900 | 200 |
| Initial | 400 nm |  | 100 | 100 | 100 |
| characteristic | 250 nm |  | 131 | 258 | 336 |
| (ratio to the output | 230 nm |  | 188 | 343 | 431 |
| at 400 nm) (%) | 215 nm |  | 206 | 397 | 469 |
| Resistance to | 3h | 250 nm | 94 | 90 | 91 |
| deterioration by | 1h | 230 nm | 97 | 94 | 91 |
| ultraviolet rays | 3h | 230 nm | 95 | 93 | 90 |
| (ratio to the | 6h | 230 nm | 94 | 91 | 89 |
| initial character- | 12h | 230 nm | 92 | 90 | 87 |
| istic at the | 1h | 215 nm | 98 | 96 | 96 |
| same wavelength) | 3h | 215 nm | 95 | 91 | 90 |

TABLE 1-2-continued

|  |  |  | Example | |  |
|---|---|---|---|---|---|
|  |  |  | 4 | 5 | 6 |
| (%) | 6h | 215 nm | 91 | 85 | 85 |
|  | 12h | 215 nm | 85 | 78 | 77 |

TABLE 2-1

|  |  |  | Comparative Example | | |
|---|---|---|---|---|---|
|  |  |  | 1 | 2 | 3 |
| Composition of | Cl |  | 650 | <0.1 | <0.1 |
| core material | OH |  | 140 | <10 | 600 |
| (ppm) | F |  | <10 | 3000 | <10 |
| Initial | 400 nm |  | 100 | 100 | 100 |
| characteristic | 250 nm |  | 241 | 4 | 341 |
| (ratio to the output | 230 nm |  | 341 | 35 | 352 |
| at 400 nm) (%) | 215 nm |  | 432 | 40 | 306 |
| Resistance to | 3h | 250 nm | 79 | output | 95 |
| deterioration by | 1h | 230 nm | 89 | power | 92 |
| ultraviolet rays | 3h | 230 nm | 86 | unmeasur- | 74 |
| (ratio to the | 6h | 230 nm | 82 | ably | 69 |
| initial character- | 12h | 230 nm | 72 | small | 60 |
| istic at the | 1h | 215 nm | 93 | output | 87 |
| same wavelength) | 3h | 215 nm | 86 | power | 59 |
| (%) | 6h | 215 nm | 75 | unmeasur- | 50 |
|  | 12h | 215 nm | 59 | ably small | 39 |

TABLE 2-2

|  |  |  | Comparative Example | |
|---|---|---|---|---|
|  |  |  | 4 | 5 |
| Composition of | Cl |  | 200 | 650 |
| core material | OH |  | 550 | 140 |
| (ppm) | F |  | <10 | <10 |
| Initial | 400 nm |  | 100 | 100 |
| characteristic | 250 nm |  | 302 | 327 |
| (ratio to the output | 230 nm |  | 319 | 368 |
| at 400 nm) (%) | 215 nm |  | 275 | 317 |
| Resistance to | 3h | 250 nm | 95 | 98 |
| deterioration by | 1h | 230 nm | 93 | 97 |
| ultraviolet rays | 3h | 230 nm | 80 | 95 |
| (ratio to the | 6h | 230 nm | 74 | 84 |
| initial character- | 12h | 230 nm | 67 | 75 |
| istic at the | 1h | 215 nm | 88 | 96 |
| same wavelength) | 3h | 215 nm | 68 | 92 |
| (%) | 6h | 215 nm | 57 | 78 |
|  | 12h | 215 nm | 46 | 60 |

EXAMPLES 7-12

Comparative Examples 6-10

The optical fibers bundled in the bundle fibers of Table 1 and Table 2 were measured for their characteristics in the same manner, the results of which are summarized in Table 3 and Table 4, respectively.

TABLE 3-1

|  |  |  | Example | | |
|---|---|---|---|---|---|
|  |  |  | 7 | 8 | 9 |
| Composition of | Cl |  | <0.1 | <0.1 | <0.1 |
| core material | OH |  | 100 | 100 | 60 |
| (ppm) | F |  | 1100 | 1400 | 1000 |
| Initial | 400 nm |  | 100 | 100 | 100 |
| characteristic | 250 nm |  | 226 | 214 | 155 |
| (ratio to the output | 230 nm |  | 290 | 271 | 229 |
| at 400 nm) (%) | 215 nm |  | 324 | 302 | 252 |
| Resistance to | 3h | 250 nm | 83 | 86 | 92 |
| deterioration by | 1h | 230 nm | 96 | 94 | 94 |
| ultraviolet rays | 3h | 230 nm | 94 | 91 | 93 |
| (ratio to the | 6h | 230 nm | 90 | 87 | 88 |
| initial character- | 12h | 230 nm | 82 | 80 | 80 |
| istic at the | 1h | 215 nm | 99 | 95 | 99 |
| same wavelength) | 3h | 215 nm | 95 | 91 | 98 |
| (%) | 6h | 215 nm | 88 | 85 | 88 |

TABLE 3-1-continued

|  |  | Example | | |
|---|---|---|---|---|
|  |  | 7 | 8 | 9 |
| 12h | 215 nm | 81 | 78 | 82 |

TABLE 3-2

|  |  |  | Example | | |
|---|---|---|---|---|---|
|  |  |  | 10 | 11 | 12 |
| Composition of core material (ppm) | Cl | | <0.1 | <0.1 | <0.1 |
|  | OH | | 30 | 200 | 450 |
|  | F | | 3300 | 900 | 200 |
| Initial characteristic (ratio to the output at 400 nm) (%) | 400 nm | | 100 | 100 | 100 |
|  | 250 nm | | 120 | 260 | 330 |
|  | 230 nm | | 177 | 340 | 420 |
|  | 215 nm | | 198 | 380 | 465 |
| Resistance to deterioration by ultraviolet rays (ratio to the initial characteristic at the same wavelength) (%) | 3h | 250 nm | 92 | 90 | 89 |
|  | 1h | 230 nm | 96 | 93 | 90 |
|  | 3h | 230 nm | 90 | 87 | 84 |
|  | 6h | 230 nm | 88 | 84 | 80 |
|  | 12h | 230 nm | 84 | 81 | 78 |
|  | 1h | 215 nm | 99 | 97 | 95 |
|  | 3h | 215 nm | 96 | 89 | 87 |
|  | 6h | 215 nm | 89 | 85 | 82 |
|  | 12h | 215 nm | 83 | 79 | 74 |

TABLE 4-1

|  |  |  | Comparative Example | | |
|---|---|---|---|---|---|
|  |  |  | 6 | 7 | 8 |
| Composition of core material (ppm) | Cl | | <0.1 | <0.1 | <0.1 |
|  | OH | | <10 | <10 | 600 |
|  | F | | 3000 | 6000 | <10 |
| Initial characteristic (ratio to the output at 400 nm) (%) | 400 nm | | 100 | 100 | 100 |
|  | 250 nm | | 12 | 12 | 307 |
|  | 230 nm | | 5 | 9 | 363 |
|  | 215 nm | | 12 | 47 | 422 |
| Resistance to deterioration by ultraviolet rays (ratio to the initial characteristic at the same wavelength) (%) | 3h | 250 nm | absolute value of output power unreliably small, unmeasurable | absolute value of output power unreliably small, unmeasurable | 89 |
|  | 1h | 230 nm | | | 82 |
|  | 3h | 230 nm | | | 78 |
|  | 6h | 230 nm | | | 65 |
|  | 12h | 230 nm | | | 47 |
|  | 1h | 215 nm | absolute value of output power unreliably small, unmeasurable | absolute value of output power unreliably small, unmeasurable | 82 |
|  | 3h | 215 nm | | | 61 |
|  | 6h | 215 nm | | | 32 |
|  | 12h | 215 nm | | | 21 |

TABLE 4-2

|  |  |  | Comparative Example | |
|---|---|---|---|---|
|  |  |  | 9 | 10 |
| Composition of core material (ppm) | Cl | | 200 | 650 |
|  | OH | | 550 | 140 |
|  | F | | <10 | <10 |
| Initial characteristic (ratio to the output at 400 nm) (%) | 400 nm | | 100 | 100 |
|  | 250 nm | | 325 | 154 |
|  | 230 nm | | 382 | 201 |
|  | 215 nm | | 445 | 231 |
| Resistance to deterioration by ultraviolet rays (ratio to the initial characteristic at the same wavelength) (%) | 3h | 250 nm | 93 | 83 |
|  | 1h | 230 nm | 86 | 87 |
|  | 3h | 230 nm | 73 | 75 |
|  | 6h | 230 nm | 60 | 63 |
|  | 12h | 230 nm | 43 | 47 |
|  | 1h | 215 nm | 82 | 82 |
|  | 3h | 215 nm | 58 | 69 |
|  | 6h | 215 nm | 38 | 27 |
|  | 12h | 215 nm | 20 | 20 |

What is claimed is:

1. A silica glass optical fiber for use at the ultraviolet region, which is composed of a doped silica glass cladding layer formed on a silica glass core, said silica glass core having (1) an OH group content of 10–1000 ppm and (2) a fluorine content of 50–5000 ppm, and (3) being substantially free of chlorine, wherein the silica glass for forming said core is synthetic silica glass produced by burning at least one member selected from a group consisting of silicon compounds of the formula $R^1mSi(OR^2)_{4-m}$, and at least one member selected from the a group consisting of fluorine compounds of the formula $C_aH_bF_c$, wherein $R^1$ and $R^2$ are each a lower alkyl group having 1 to 4 carbon atoms, and $0 \leq m \leq 4$, $1 \leq a \leq 3$, $0 \leq b \leq 7$, and $1 \leq c \leq 8$, with oxyhydrogen flame, and vitrifying synthesized silica fine particles.

2. The silica glass fiber for use at the ultraviolet region as claimed in claim 1, wherein the ratio of the silicon compound to the fluorine compound is 100:0.5 to 10.

3. A bundle fiber for use at the ultraviolet region, wherein a number of optical fibers of claim 2 is bundled.

4. The silica glass fiber for use at the ultraviolet region as claimed in claim 1, wherein the cladding layer is made of a silica glass containing at least one dopant which is a member select from a group consisting of B and F.

5. A bundle fiber for use at the ultraviolet region, wherein a number of optical fibers of claim 1 is bundled.

6. A method of transmitting energy or signals wherein a bundle fiber for use at the ultraviolet region, which consists of a number of optical fibers of claim 1 bundled therein is used for transmitting ultraviolet rays.

7. A method of transmitting energy or signals wherein a bundle fiber for use at the ultraviolet region, which consists of a number of optical fibers of claim 1 bundled therein is used for transmitting ultraviolet rays.

8. A method of transmitting energy or signals using ultraviolet rays, which comprises transmission of ultraviolet energy or signals through a silica glass optical fiber resistant to degradation by ultraviolet rays composed of a doped silica glass cladding layer formed on a silica glass core or a bundle fiber consisting of a number of said fibers, said silica glass core having (1) an OH group content of 10–1000 ppm and (2) a fluorine content of 50–5000 ppm, and (3) being substantially free of chlorine.

9. The method of transmitting energy or signals as claimed in claim 8, which comprises transmission of ultraviolet rays through a silica glass fiber for use at the ultraviolet region, wherein the silica glass for forming said core is obtained by burning at least one member selected from a group consisting of silicon compounds of the formula $R^1mSi(OR^2)_{4-m}$, and at least one member selected from a group consisting of fluorine compounds of the formula $C_aH_bF_c$ wherein $R^1$ and $R^2$ are each a lower alkyl group having 1 to 4 carbon atoms, and $0 \leq m \leq 4$, $1 \leq a \leq 3$, $0 \leq b \leq 7$, and $1 \leq c \leq 8$, with oxyhydrogen flame, and vitrifying synthesized silica fine particles.

10. The method of transmitting energy or signals according to claim 9, wherein the ratio of the silicon compound to the fluorine compound is 100:0.5 to 10.

11. The method of transmitting energy or signals according to claim 8, wherein the cladding layer contains at least one dopant which is a member selected from the group consisting of B and F.

12. An ultraviolet ray transmitting system comprising a light source to emit ultraviolet rays, and an optical fiber to transmit the ultraviolet rays emitted by said light source, wherein said optical fiber is composed of a doped silica glass cladding layer formed on a silica glass core, said silica glass core has an OH group content of 10–1000 ppm and a fluorine content of 50–5000 ppm, and being substantially free of chlorine, and has resistance to deterioration caused by the ultraviolet rays being transmitted.

13. A method of transmitting ultraviolet rays using an ultraviolet ray transmitting system comprising a light source emitting ultraviolet rays, and an optical fiber receiving and transmitting said ultraviolet rays emitted by said light source, wherein said optical fiber is composed of a doped silica glass cladding layer formed on a silica glass core, said silica glass core has an OH group content of 10–1000 ppm and a fluorine content of 50–5000 ppm, is substantially free of chlorine, and has resistance to deterioration caused by said ultraviolet rays.

* * * * *